United States Patent [19]
Donato et al.

[11] Patent Number: 5,295,412
[45] Date of Patent: Mar. 22, 1994

[54] PARK LOCKING MECHANISM

[75] Inventors: John M. Donato, Wixom, Mich.; Robert S. McKee, Palatine; Peter M. Giannis, Arlington Heights, both of Ill.

[73] Assignee: Chrysler Corporation, Highland Park, Mich.

[21] Appl. No.: 88,718

[22] Filed: Jul. 9, 1993

[51] Int. Cl.$^5$ .................... G05G 1/00; B60K 41/26; B60K 20/00
[52] U.S. Cl. .............. 74/577 R; 74/577 M; 74/606 R; 74/473 R; 192/4 A; 192/114 R
[58] Field of Search ............. 192/4 A, 114 R, 114 T; 475/331; 74/473 R, 575, 577 R, 577 S, 577 M, 578, 606 R

[56] References Cited

U.S. PATENT DOCUMENTS

| | | | |
|---|---|---|---|
| 4,519,483 | 5/1985 | Schlicker | 192/4 A |
| 4,614,256 | 9/1986 | Kuwayama et al. | 192/4 A |
| 4,667,783 | 5/1987 | Sugano et al. | 74/577 S |
| 4,709,793 | 12/1987 | Sakakibara et al. | 74/473 R |
| 4,727,967 | 3/1988 | Ogasawara et al. | 192/4 A |
| 4,982,620 | 1/1991 | Holbrook et al. | 74/731 |
| 5,086,895 | 2/1992 | Nemoto | 74/473 R X |
| 5,178,588 | 1/1993 | Hashimoto et al. | 475/331 |
| 5,183,138 | 2/1993 | Jolliff | 192/4 A |

FOREIGN PATENT DOCUMENTS

| | | | |
|---|---|---|---|
| 4035390 | 5/1991 | Fed. Rep. of Germany | 192/4 A |
| 4-85153 | 3/1992 | Japan | 192/4 A |

*Primary Examiner*—Vinh T. Luong
*Attorney, Agent, or Firm*—Edward P. Barthel

[57] ABSTRACT

There is disclosed herein a park locking mechanism for a selected gear of a vehicle transmission. The mechanism includes a manually actuatable shift rod, a pivotally mounted pawl lever for selectively engaging the gear, a rod assembly operatively connected to the pawl lever, a rotatable rod operatively connected to the shift rod, an actuating lever secured to the rotatable rod for rotation therewith, "lock" and "unlock" recesses formed in the distal end of the actuating lever, spring-loaded lug means for alternately engaging said recesses, and an opening formed in the actuating lever for connection with the rod assembly for pivoting the pawl lever into engagement with said selected gear when the PARK mode is selected by the operator.

6 Claims, 4 Drawing Sheets

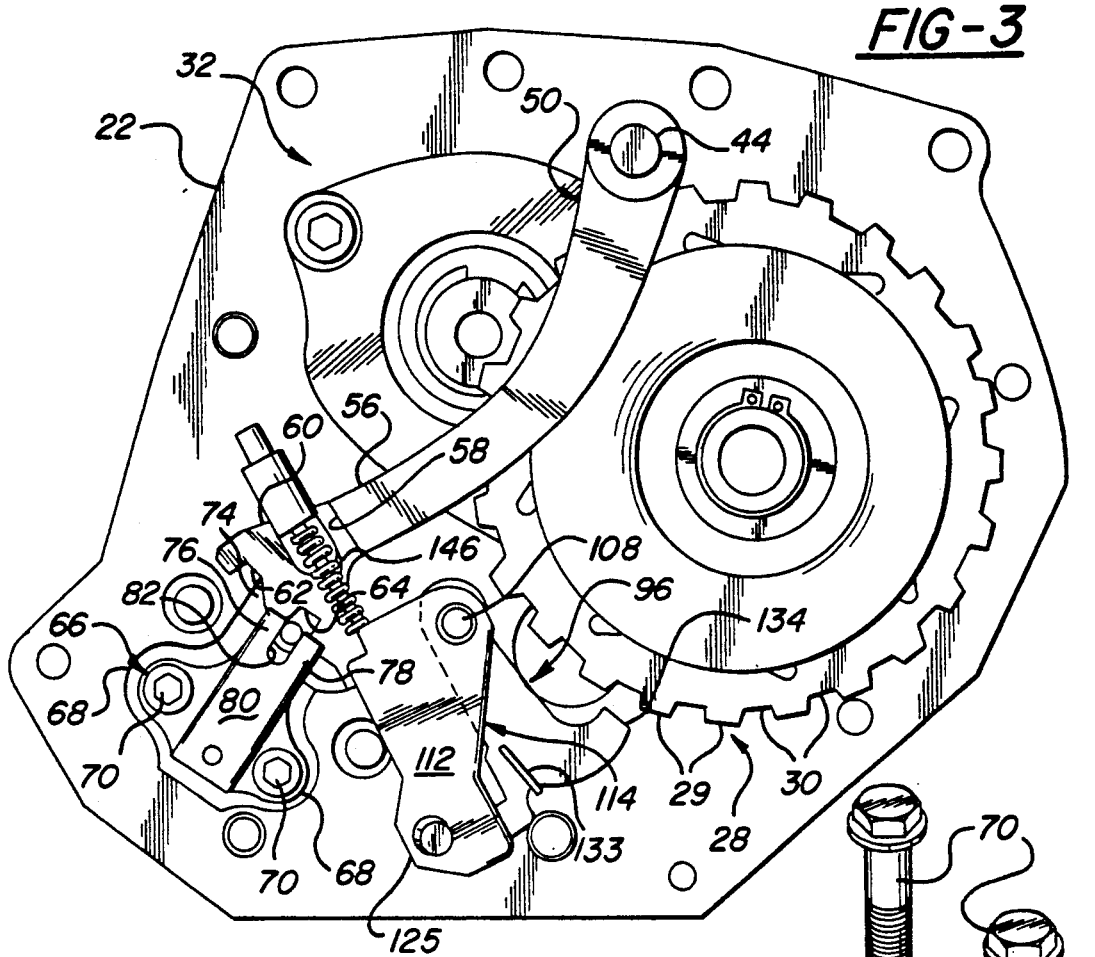
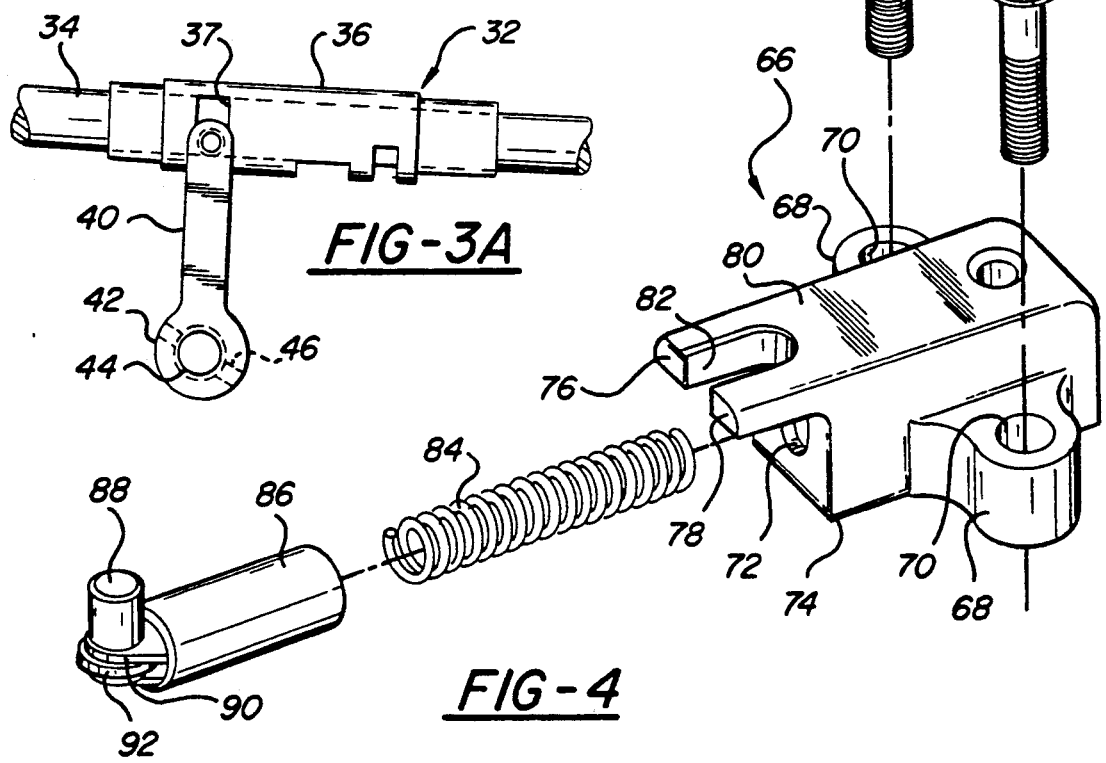

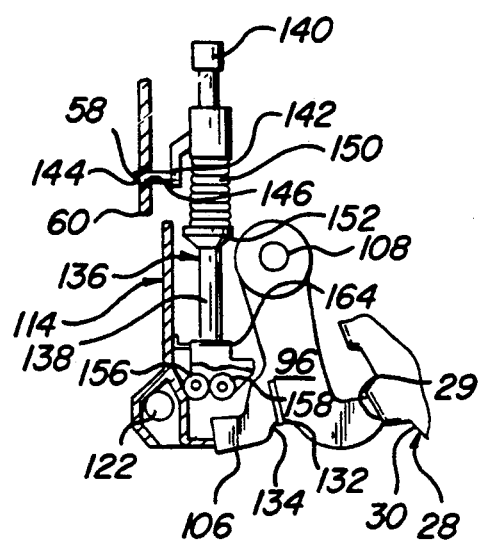
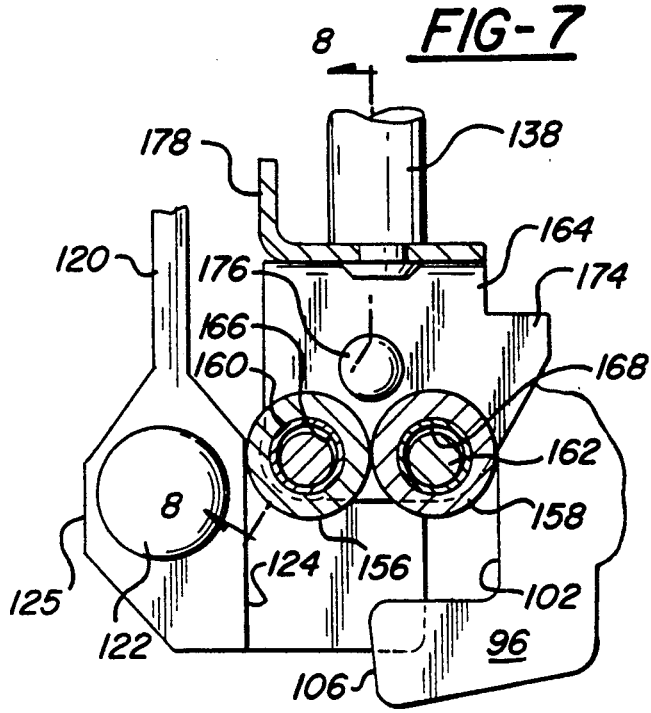
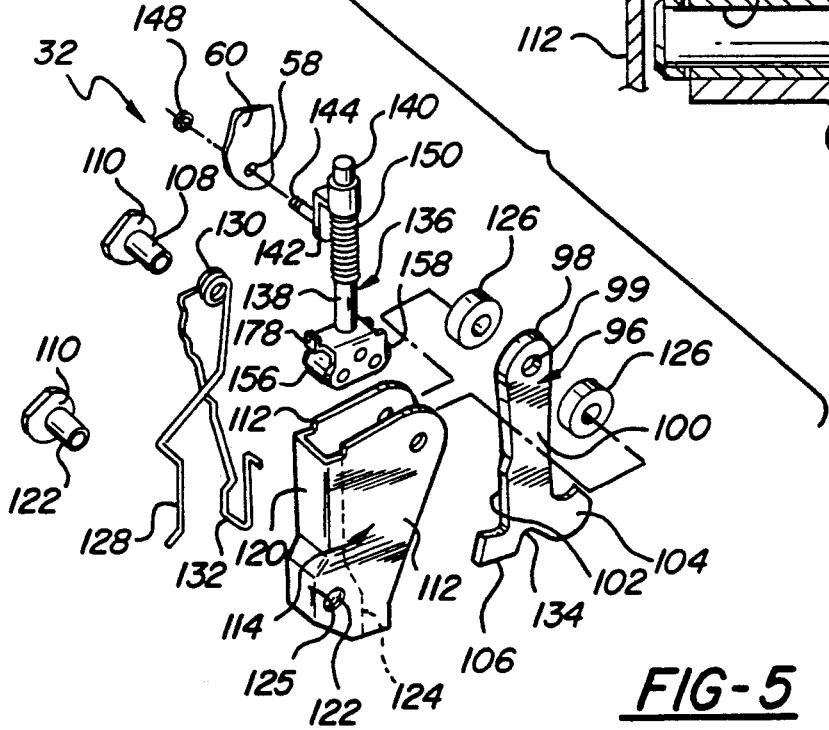
FIG-6
FIG-7
FIG-8
FIG-5

PARK LOCKING MECHANISM

TECHNICAL FIELD

This invention relates generally to vehicle transmissions and, more particularly to park locking mechanisms therefor.

BACKGROUND ART

Heretofore, a park locking mechanism or sprag was disclosed in Holbrook et al. U.S. Pat. No. 4,982,620, assigned to the assignee of the present invention, including a pawl lever operating in conjunction with a retainer bracket and a pair of laterally adjacent cam rollers to lock a gear to a transmission case when the PARK operating mode of the transmission is manually selected by the operator of the vehicle.

DISCLOSURE OF THE INVENTION

A general object of the invention is to provide an improved park locking mechanism in a vehicle transmission.

Another object of the invention is to provide an improved park locking mechanism including an intermediate locking and actuating mechanism between the shift rod and a pawl lever operable with a gear of the transmission.

A further object of the invention is to provide a park locking mechanism including a lever secured for rotation with the usual shift rod and locked against rotation by virtue of a spring-loaded lug engageable with recesses formed in the lever, and adaptable to move a rod assembly to, in turn, pivot a pawl lever to engage a gear of the transmission when the PARK mode is selected.

These and other objects and advantages will become more apparent when reference is made to the following drawings and the accompanying description.

BRIEF DESCRIPTION OF THE DRAWINGS

FIG. 3 is an end view of the inventive parking lock structure embodied in the transmission;

FIG. 3A is a fragmentary view supplemental to the FIG. 3 structure;

FIG. 4 is an exploded view of another portion of the FIG. 3 structure;

FIG. 5 is an exploded view of another portion of the FIG. 3 structure;

FIG. 6 is a cross-sectional side elevational view of the assembled elements of the FIG. 5 structure;

FIG. 7 is an enlarged view of a portion of the FIG. 6 structure;

FIG. 8 a cross-sectional view taken along the plane of the line 8—8 of FIG. 7, and looking in the direction of the arrows;

BEST MODE OF CARRYING OUT THE INVENTION

Figure 1:
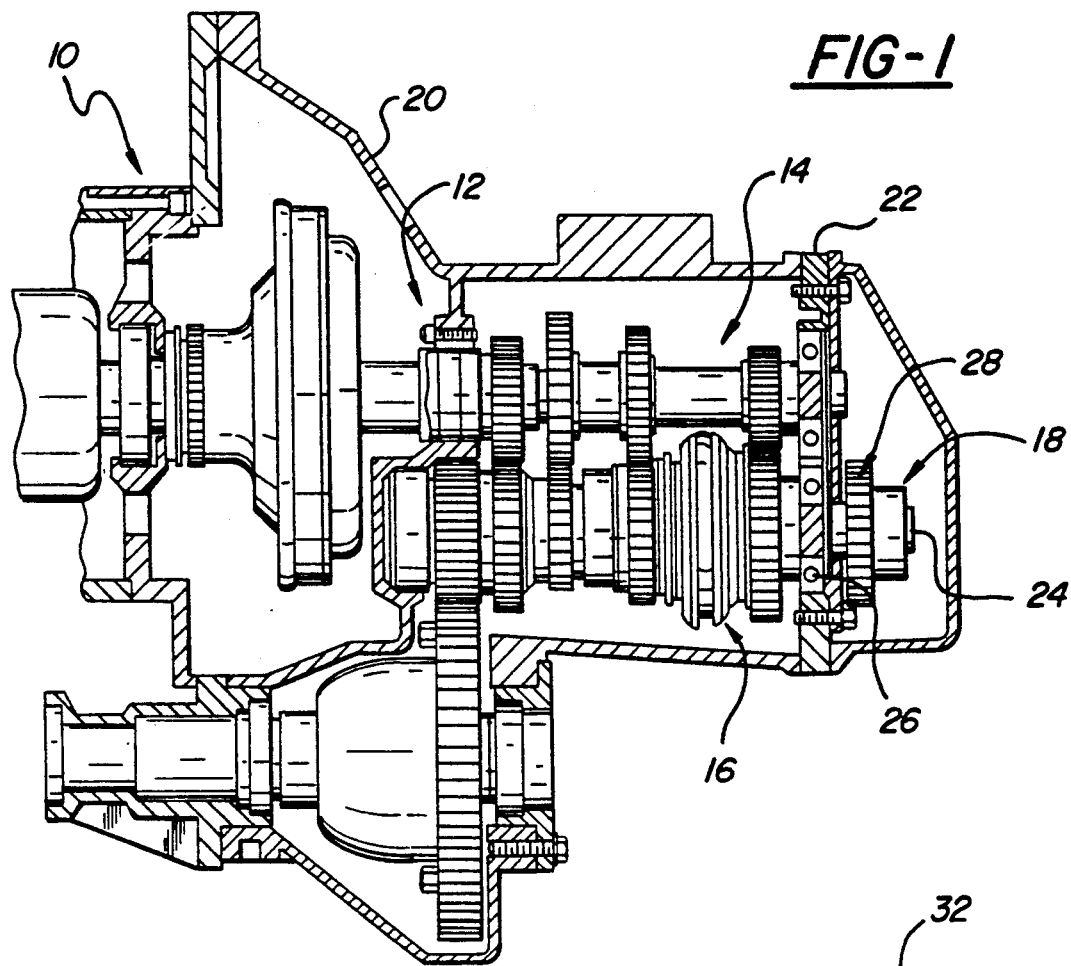
FIG. 1 is a side elevational view in partial cross-section of a transmission embodying the invention.

Referring now to the drawings in greater detail, FIG. 1 illustrates a two-speed transmission 10 embodying the invention. The transmission 10 includes generally an input shaft assembly 12, an input gear assembly 14 axially aligned with the assembly 12, a transfer shaft assembly 16 parallel to the assemblies 12 and 14, and a parking lock mechanism 18 associated with the assembly 16. The assemblies 14 and 16 are supported at the left end of FIG. 1 in openings formed in the usual clutch and flywheel housing 20. The right ends of the assemblies 14 and 16 in FIG. 1 are shown supported in a bearing support plate 22. The shaft 24 of the assembly 16 extends through a bearing 26 in the plate 22 to support a parking lock gear 28. The gear 28 includes a plurality of teeth 29 with spaces 30 therebetween.

Figure 2:
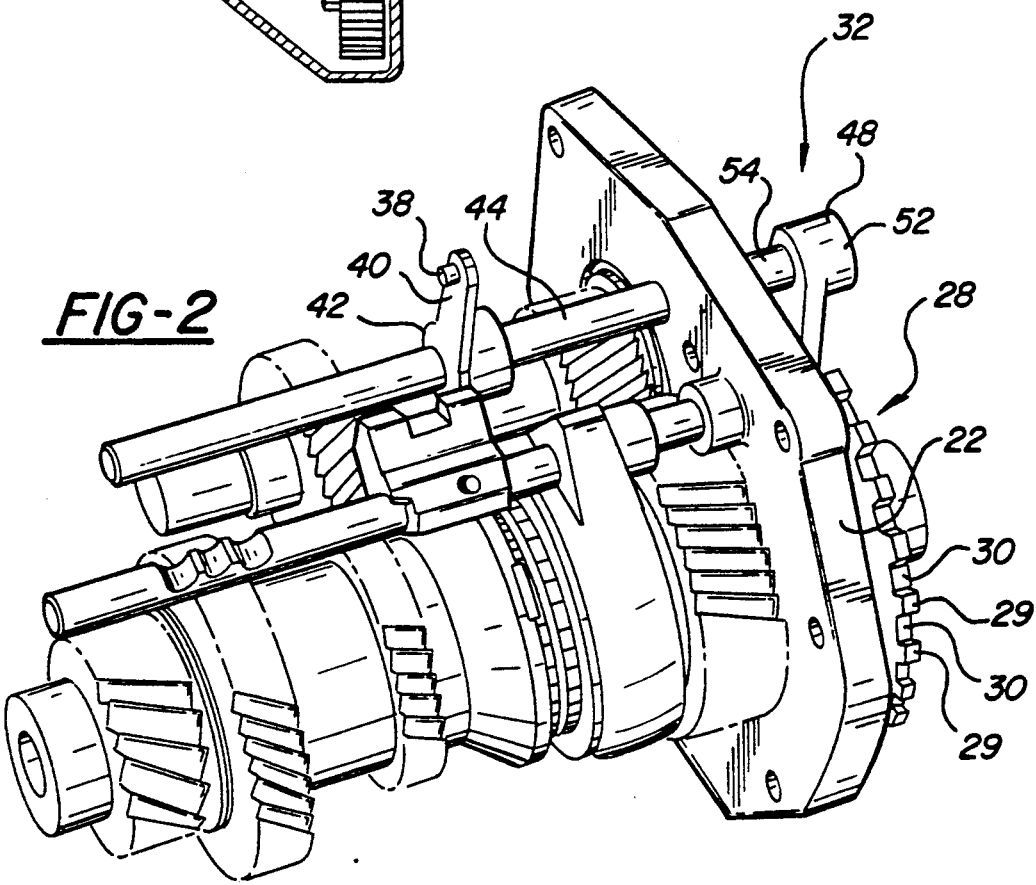
FIG. 2 is a perspective view of a portion of the transmission not shown in FIG. 1.

As shown in FIGS. 2, 3 and 3A, a park locking mechanism 32 includes a shift rod 34 (FIG. 3A) slidably movable by a manually actuated shift lever (not shown) available to the vehicle operator. A sleeve 36 secured around the shift rod 34 includes a slot 37 for pivotally receiving therein a pivot lug 38 on the distal end of a lever 40 having a second sleeve-like end 42 adapted to being mounted around a rod 44 rotatably mounted through the support plate 22. The end 42 is secured to the rod 44 by a roll pin 46. A sleeve-like end 48 (FIG. 2) of an arcuate-shaped locking lever 50 (FIG. 3) is secured by a roll pin 52 to the extended end 54 of the rod 44. The other end portion 56 (FIG. 3) of the arcuate-shaped lever 50 includes a right angled step 58 connected to a wide segment 60 having spaced recesses 62 and 64 formed therein.

A block member 66 includes oppositely disposed mounting flanges 68 formed thereon. A pair of bolts 70 extend through the respective mounting flanges 68 to secure the block member 66 to the bearing support plate 22. A longitudinal opening 72 (FIG. 4) is formed in the center of one end 74 of the block member 66. Spaced apart extensions 76 and 78 are formed on the corners of the outer side of the one end 80 of the block member 66, forming a slot 82 between the extensions 76 and 78. A coil spring 84 (FIG. 4) is mounted in the longitudinal opening 72. A sleeve 86 is mounted around the spring 84 in the opening 72. A lug 88 is secured to the outer end 90 of the sleeve 86 so as to extend outwardly into the slot 82, with a roller portion 92 on the axis of the sleeve 86 positioned adjacent the edge of the wide segment 60 and the spaced recesses 62 and 64.

As shown in FIG. 5, the park locking mechanism 32 further includes a pawl lever or member, generally indicated at 96. The pawl member 96 includes a head portion 98 with an opening 99 formed therethrough, a body portion 100, and a pressure edge portion 102, a toe portion 104, and a heel portion 106. The head portion 98 of the pawl member 96 is pivotally connected about a pivot pin 108 of the transmission case, represented at 110, and extending between oppositely disposed side walls 112 of a retainer bracket, generally indicated at 114. The retainer bracket 114 is U-shaped in cross-section and includes diverging wall portions 116 and 118 joined to a back wall portion 120 (FIG. 7). A mounting pin 122 extends from the transmission case 110 laterally between vertical inner and outer walls 124 and 125 extending below the diverging wall portions 116 and 118.

Figure 10:
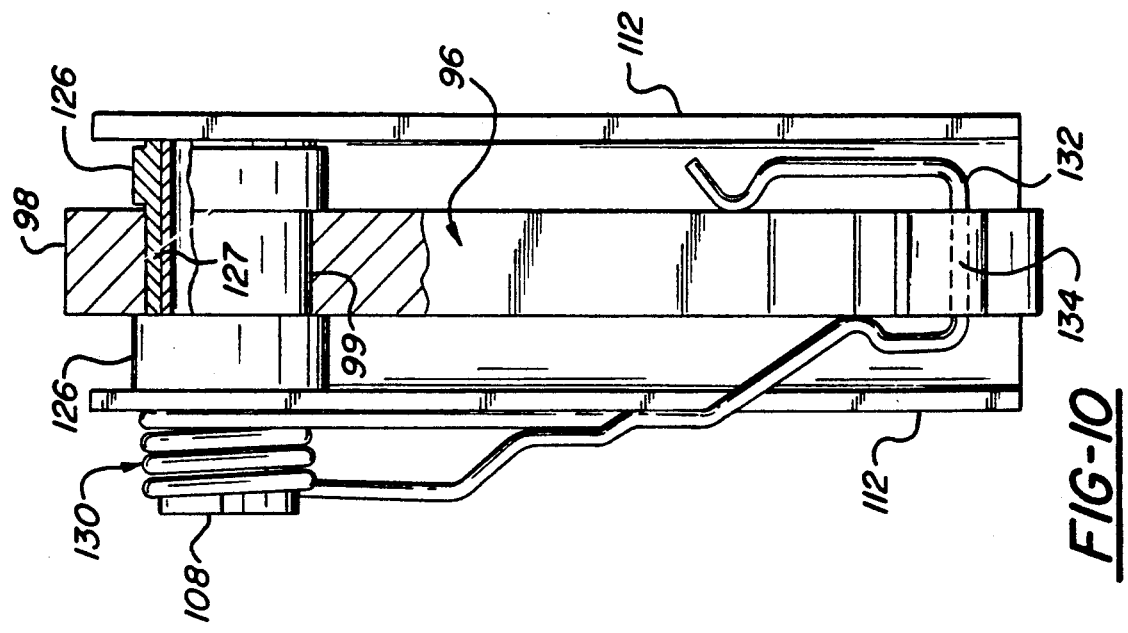
FIG. 10 is an end view of the FIG. 10 structure.

Washers 126 are disposed about each side of the pawl member 96 and the pin 108 between the side walls 112 of the retainer bracket 114, with a bushing extension 127 (FIG. 10) on one washer 126 extending through the opening 99 around the pivot pin 108 (FIG. 10). A spring means comprising a spring 130 is disposed about the pin 108 and has one extended end 128 engaging the back wall 120 of the retainer bracket 114 and the other extended end 132 engaging an instep 134 formed on the bottom edge of the pawl member 96. The spring 130 biases the pawl member 96 toward the inner wall portion 124 of the retainer bracket 114.

The pawl member 96 cooperates with a rod assembly, generally indicated at 136. The rod assembly 136 comprises a rod 138 having a cap member 140 secured at one end. A downwardly and outwardly extending attachment member 142 is disposed about the rod 138. The attachment member 142 includes a lug 144 disposed in an aperture 146 formed through the wide segment 60 of the lever 50, intermediate the step 58 and the two recesses 62 and 64, and secured thereto by a snap ring 148. A spring 150 is disposed about the rod 138 between the cap member 140 and a shoulder 152 (FIG. 6) on the rod 138.

The other end of the rod 138 includes a pair of laterally adjacent cam rollers 156 and 158 (FIG. 7) journally supported thereon by their associated support pins 160 and 162, respectively, secured to a U-shaped carrier or bracket member 164, as illustrated in FIG. 7. Each of the rollers 156 and 158 are formed with a central bore 166 and 168, respectively. The bores 166 and 168 receive the pins 160 and 162, respectively, therethrough in an oversize manner such that each of the rollers 156 and 158 are free for predetermined limited transverse movement relative to its associated pin so as to rollingly engage the remaining roller.

The U-shaped bracket member 164 includes an inclined projection 174 extending outwardly parallel with the sides thereof. A projection 176 extends outwardly from each side of the U-shaped bracket member 164 to guide the bracket member between the sides 112 of the retainer bracket 114, as illustrated in FIG. 8. The U-shaped bracket member 164 also includes an inverted "L" shaped portion 178.

The pawl member 96 abuts the bracket member 164 due to the biasing of the end 132 of the spring 130, when the shift lever is not in park P. When a shift position or gear selector lever connected to the sleeve 36 (FIG. 3A) around the shift rod 34 is moved by the operator to the PARK position, the shift rod 34 (FIG. 3) is shifted, pivoting the lever 40 (FIG. 3A) to thereby rotate the rod 44 and its associated locking lever 50 (FIG. 3). The latter action serves to urge the roller 92 out of the recess 64 against the force of the spring 84 (FIG. 4) within the block member 66, as the lever rotates in a counter-clockwise direction in FIG. 3 until the recess 62 is aligned with the roller 92 which then is urged by the spring 84 into the recess 62. Concurrently, the lug 144 is moved by the aperture 146 and the wide segment 60 of the lever 50, to thus cause the rod 138 to move downwardly within the side walls 112 of the bracket 114.

Figure 9:
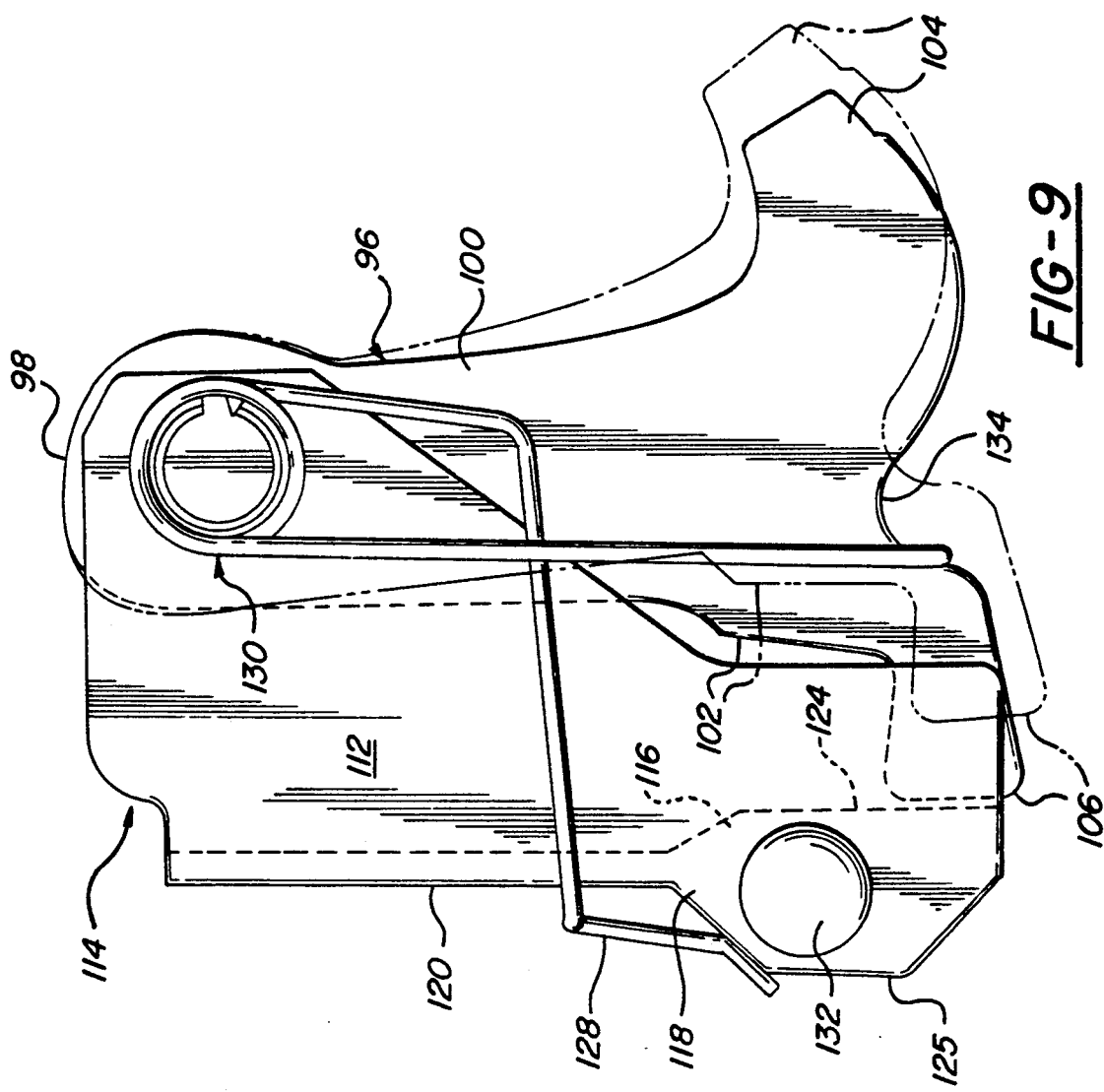
FIG. 9 is a view from the opposite side of the FIG. 7 structure illustrating an operational characteristic of the invention.

The rollers 156 and 158 are caused to roll along the back wall portion 120 of the retainer bracket 114 and the pressure edge portion 102 of the pawl member 96, respectively. One of the rollers (158) engages the edge of the body portion 100 of the pawl member 96 and one of the rollers (156) engages the inner wall portion 124 of the retainer bracket 114, as illustrated in FIG. 7. This causes the pawl member 96 to be displaced or rotated about the pin 108, moving the heel portion 106 away from the inner wall 124 of the bracket 114 (FIG. 9). The rod 138 moves downwardly until the toe portion 104 of the pawl member 96 has engaged a space 30 between a pair of adjacent teeth 29 in the gear 28, and the rollers 156 and 158 abuttingly interconnect the pressure edge portion 102 of the pawl member 96 and the vertical inner wall 124 below the offset wall portion 116 of the retainer bracket 114. The operation is reversed, with the rollers 156 and 158 being lifted, when the shift lever is in a position other than the park P position.

When the shift lever position is in park P position, the pawl member 96 may not directly engage a space 30 (FIG. 6) between adjacent teeth 29 in the gear 28. In this case, the toe portion 104 of the pawl member 96 contacts a tooth 29 on the gear 28. When the vehicle rolls just slightly, causing the gear 28 to rotate, the biased spring 150 moves the rod 138 and carrier 164 downwardly and, in turn, moves the pawl member 96 to the right in FIG. 6 to cause the toe portion 104 to move into the next available space 30 in the gear 28 to lock the gear in place.

INDUSTRIAL APPLICABILITY

It should be apparent that the invention provides a novel park locking mechanism which is particularly adaptable to a manual transmission.

While but one embodiment of the invention has been shown and described, other modifications are possible within the scope of the following claims.

What is claimed is:

1. A park locking mechanism for a selected gear of a vehicle transmission, including manually actuatable shift rod, a pivotally mounted pawl lever for selectively engaging the gear, and a rod assembly operatively connected to said pawl lever, the improvement comprising a rotatable rod operatively connected to said shift rod, a locking lever secured to said rotatable rod for rotation therewith, a pair of recesses formed in the distal end of said locking lever, spring-loaded lug means for alternately engaging said recesses, and connector means between said locking lever and said rod assembly for pivoting said pawl lever into and out of engagement with said selected gear.

2. The park locking mechanism improvement described in claim 1, wherein said spring-loaded lug means includes a fixed hollow block member, a sleeve slidably mounted in said hollow block member, a lug formed on the outer end of said sleeve, and a spring mounted in said sleeve for urging said lug into alternate engagement with said recesses.

3. The park locking mechanism improvement described in claim 1, wherein said connector means includes an opening formed in said locking lever adjacent said recesses, a lug formed on an end of said rod assembly and mounted in said opening for moving said rod assembly to thereby pivot said pawl lever into or out of engagement with said gear to lock-up the transmission.

4. The park locking mechanism improvement described in claim 3, and an abutment portion formed on said pawl lever, wherein said rod assembly includes a fixed bracket, an inwardly off-set surface formed in said fixed bracket, a rod mounted for reciprocal movement in said fixed bracket, a pair of rollers mounted on the end of said rod and operable against said inwardly off-set surface and said abutment portion to pivot said pawl lever into engagement with said selected gear.

5. The park locking mechanism improvement described in claim 4, and a spring operatively connected to said pawl lever to urge said pawl lever away from said selected gear.

6. A park locking mechanism for a selected gear of a vehicle transmission, including a slidably mounted manually actuatable shift rod, a pawl lever for selectively engaging the gear, and a rod assembly operatively connected to said pawl lever, the improvement comprising a rotatable rod, a lever operatively connected between said rotatable rod and said shift rod for rotating said rotatable rod upon slidable actuation of said shift rod, a locking lever secured to said rotatable rod for rotation therewith, a pair of recesses formed in the distal end of said locking rod, a fixed hollow block member, a sleeve slidably mounted in said hollow block member, a first lug formed on the outer end of said sleeve, a spring mounted in said sleeve for urging said first lug into alternate engagement with said recesses, an opening formed in said locking lever adjacent said recesses, a second lug formed on an end of said rod assembly and extended into said opening for moving said rod assembly to thereby pivot said pawl lever into or out of engagement with said gear to lock-up the transmission.

* * * * *